Jan. 25, 1966 W. M. WISE 3,231,035
LOAD WEIGHING SYSTEM
Filed Oct. 28, 1963 11 Sheets-Sheet 1
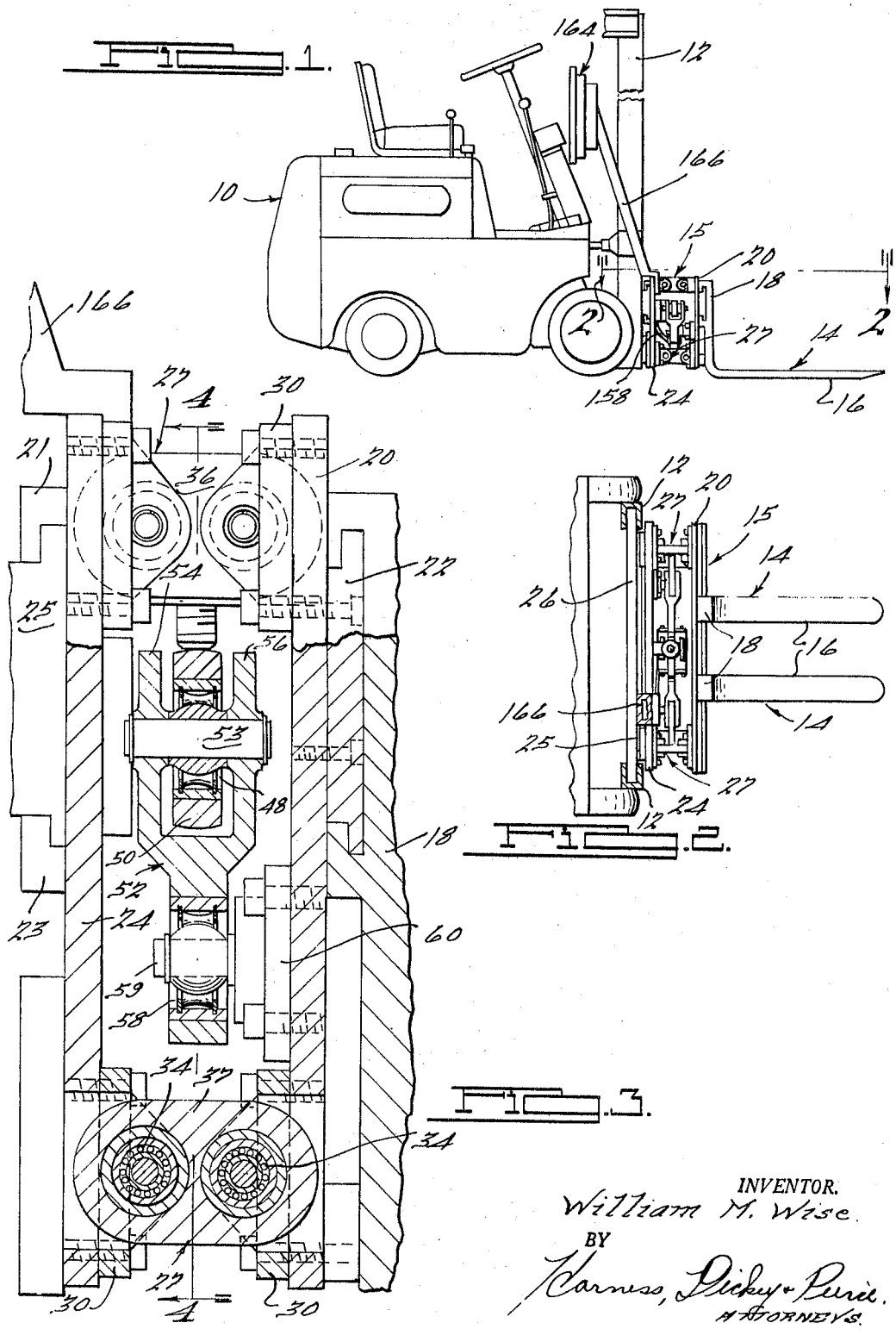
INVENTOR.
William M. Wise
BY
Harness, Dickey & Pierce
ATTORNEYS Jan. 25, 1966 W. M. WISE 3,231,035
LOAD WEIGHING SYSTEM
Filed Oct. 28, 1963 11 Sheets-Sheet 2
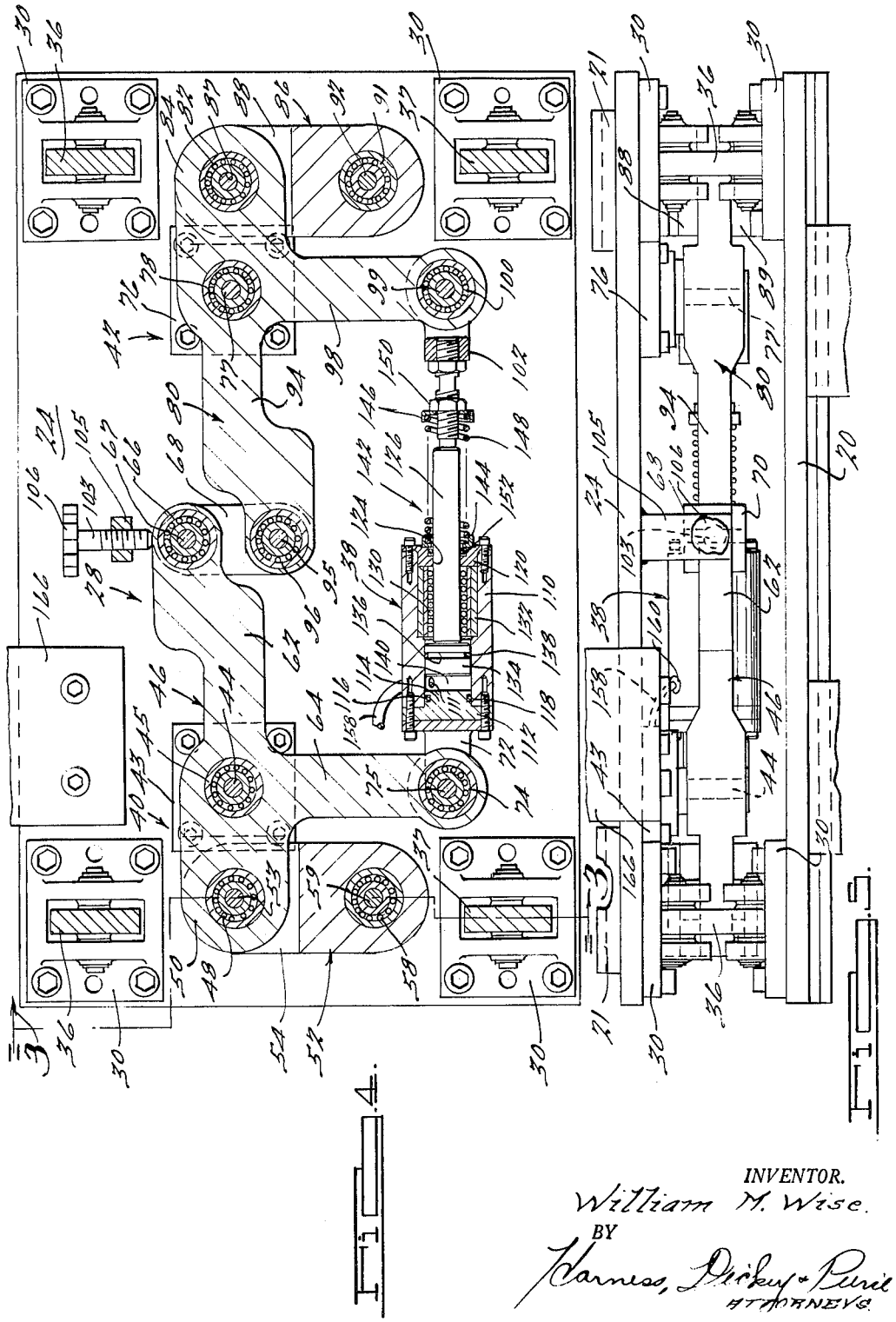
INVENTOR.
William M. Wise.
BY
Harness, Dickey & Pierce
ATTORNEYS

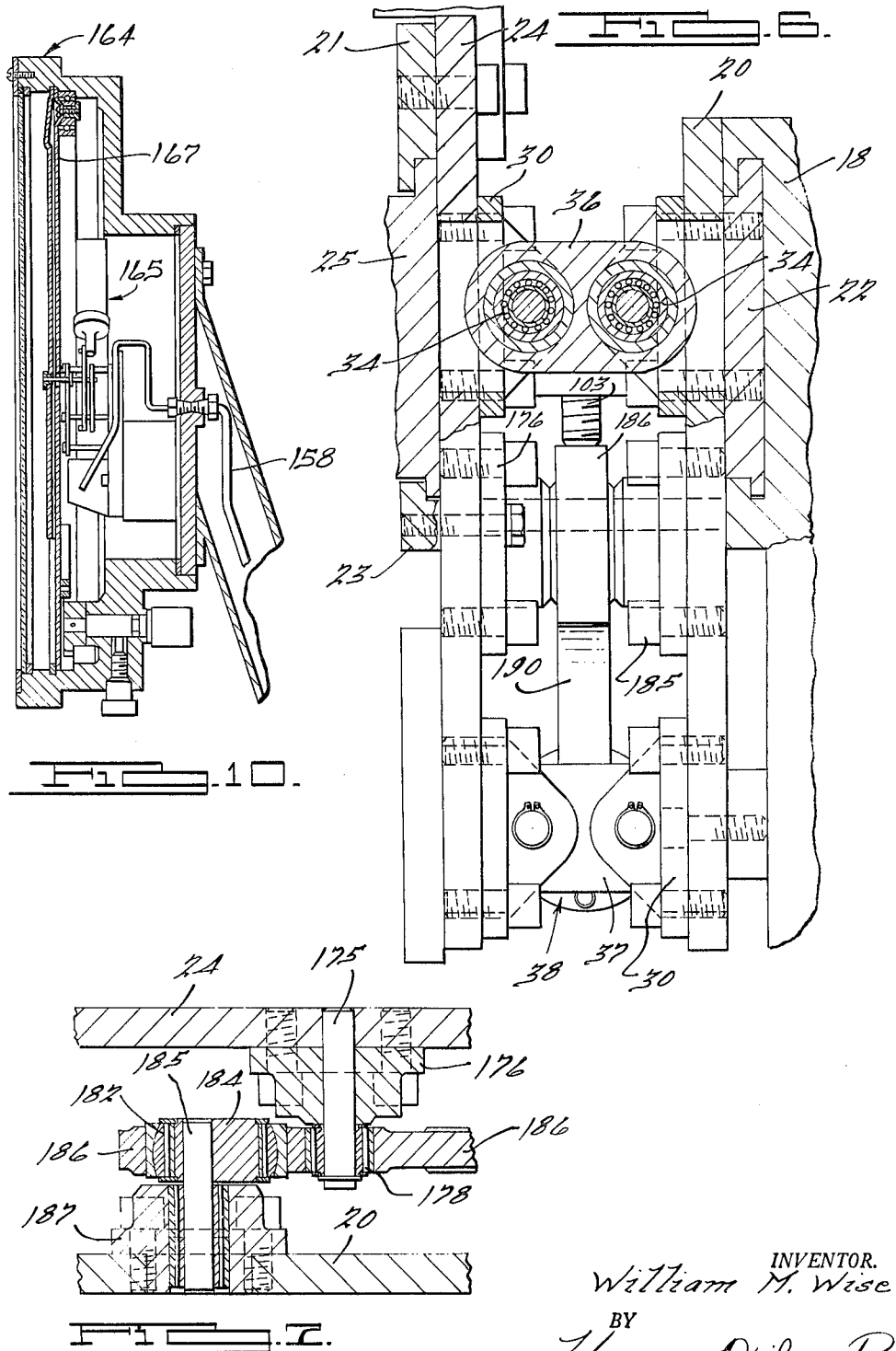

Jan. 25, 1966    W. M. WISE    3,231,035
LOAD WEIGHING SYSTEM
Filed Oct. 28, 1963    11 Sheets-Sheet 4
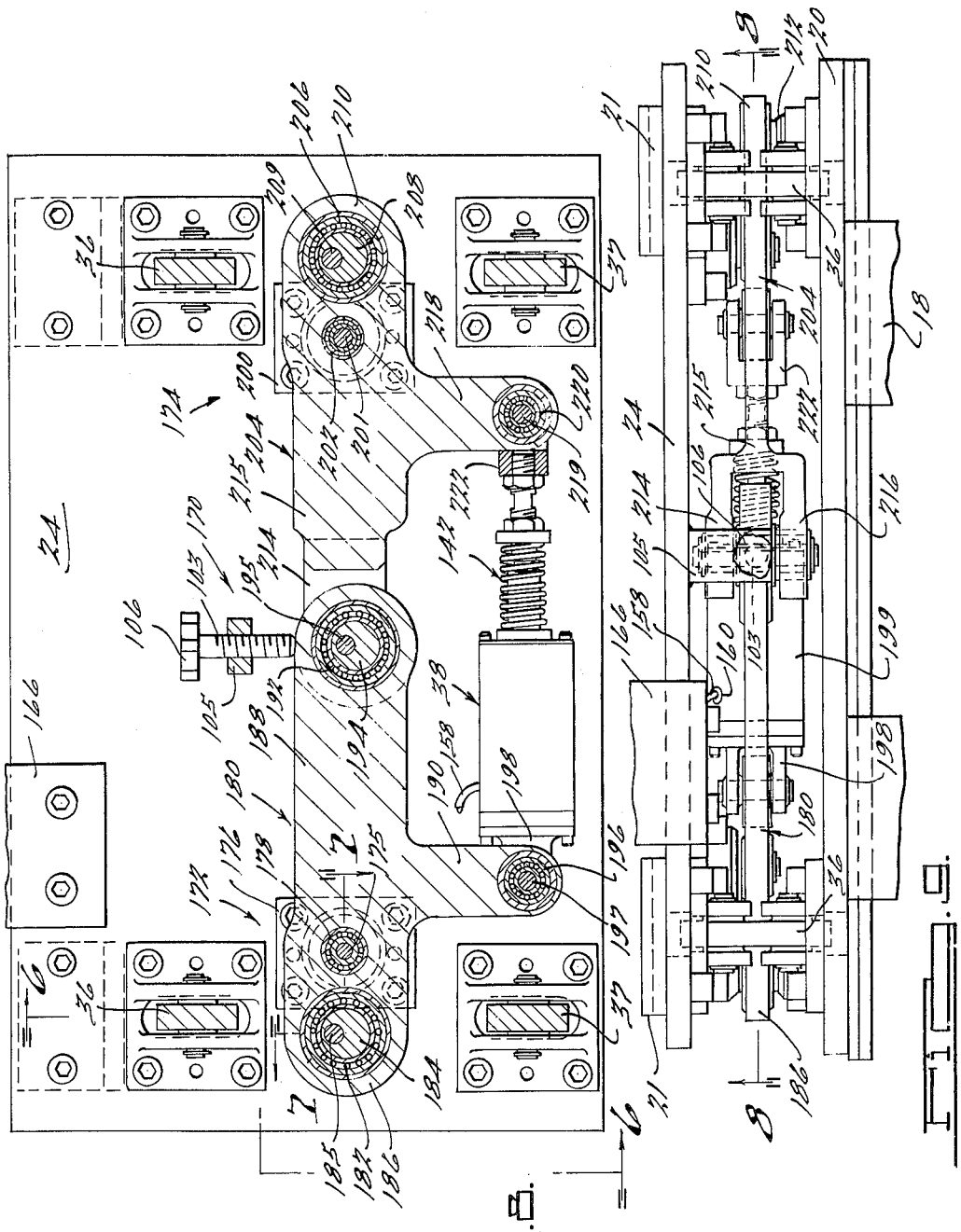
INVENTOR.
William M. Wise.
BY
Harness, Dickey & Pierce.
ATTORNEYS.

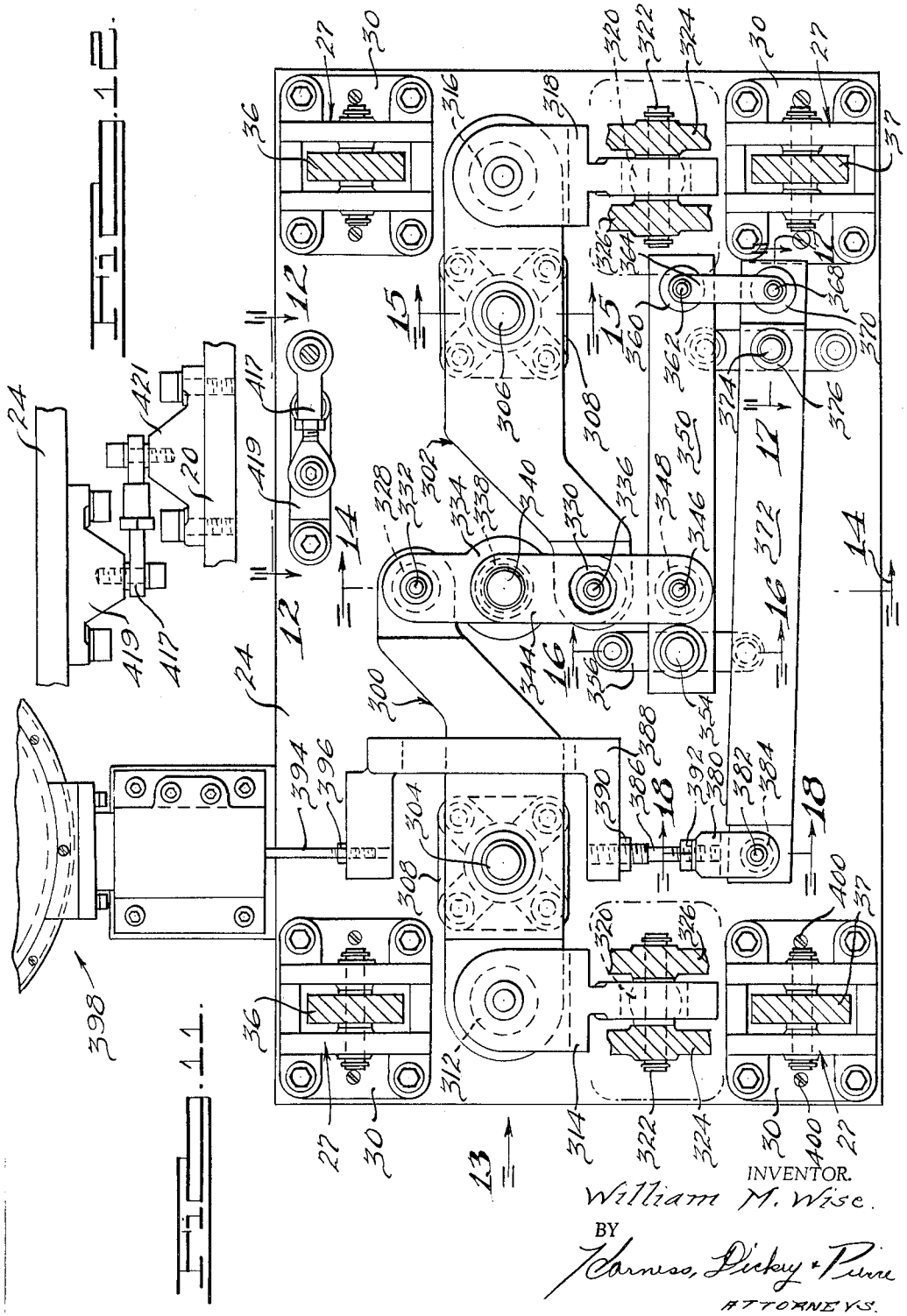

Jan. 25, 1966 W. M. WISE 3,231,035
LOAD WEIGHING SYSTEM
Filed Oct. 28, 1963 11 Sheets-Sheet 6
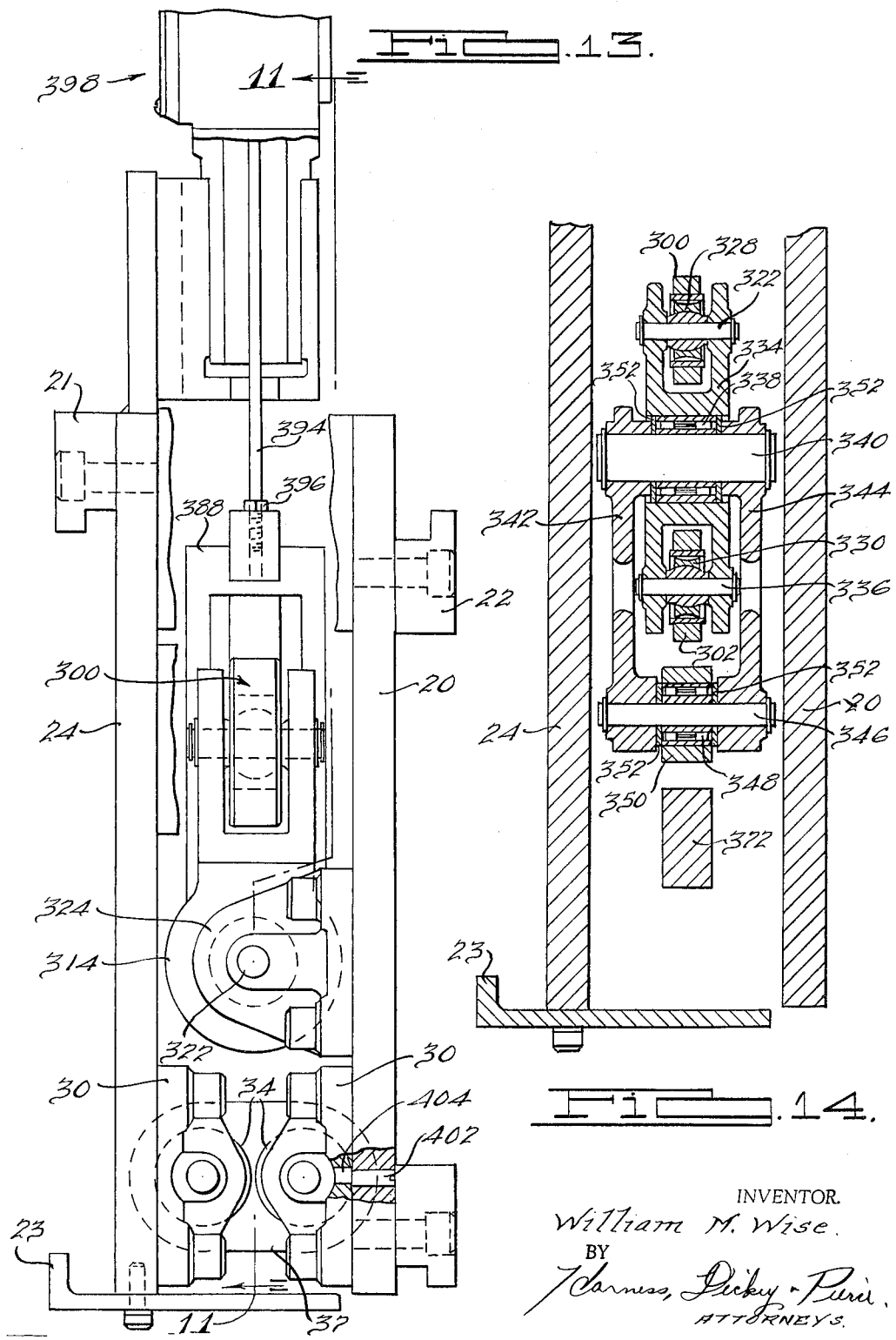
INVENTOR.
William M. Wise.
BY
Harness, Dickey & Pierce.
ATTORNEYS.

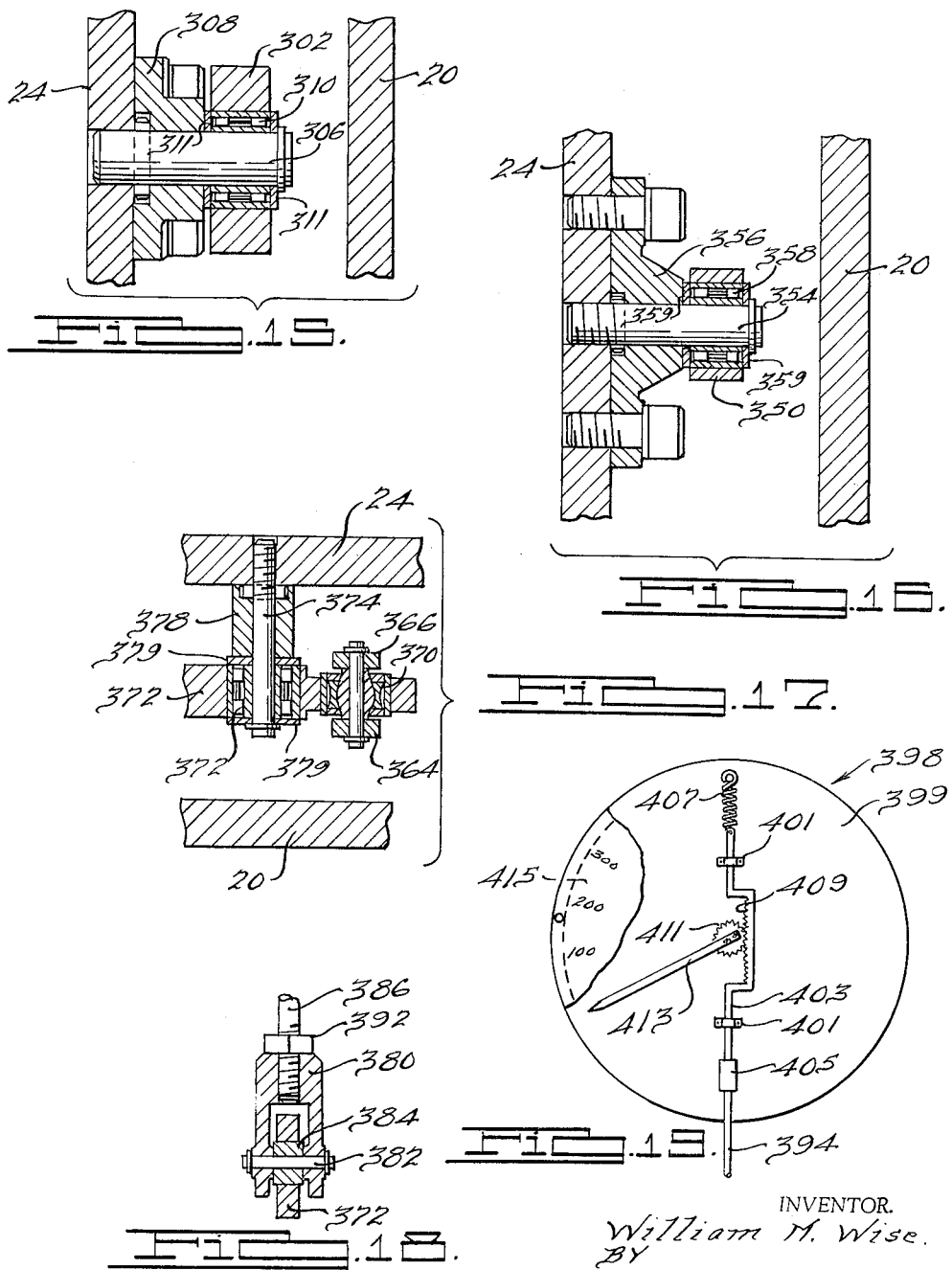

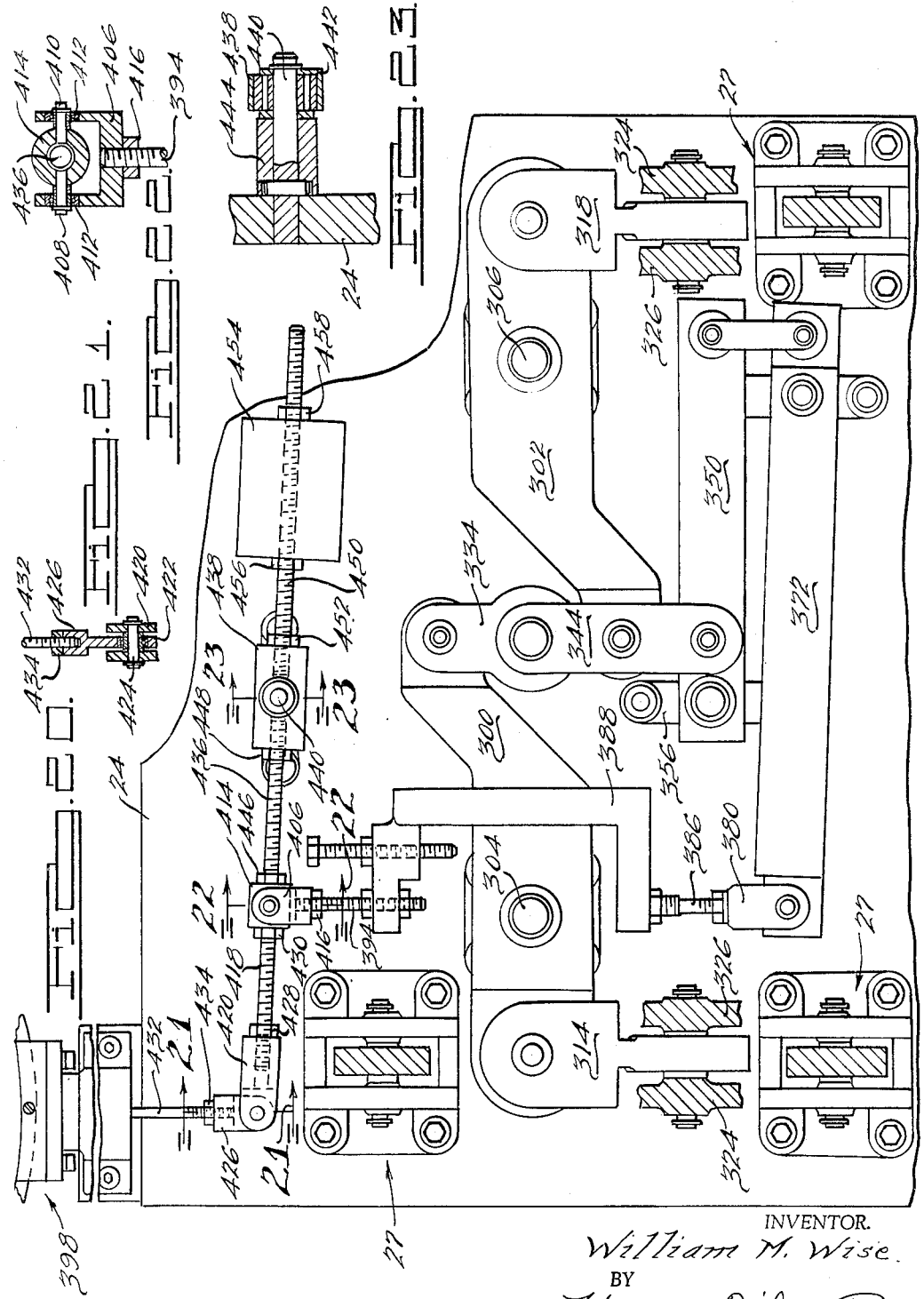

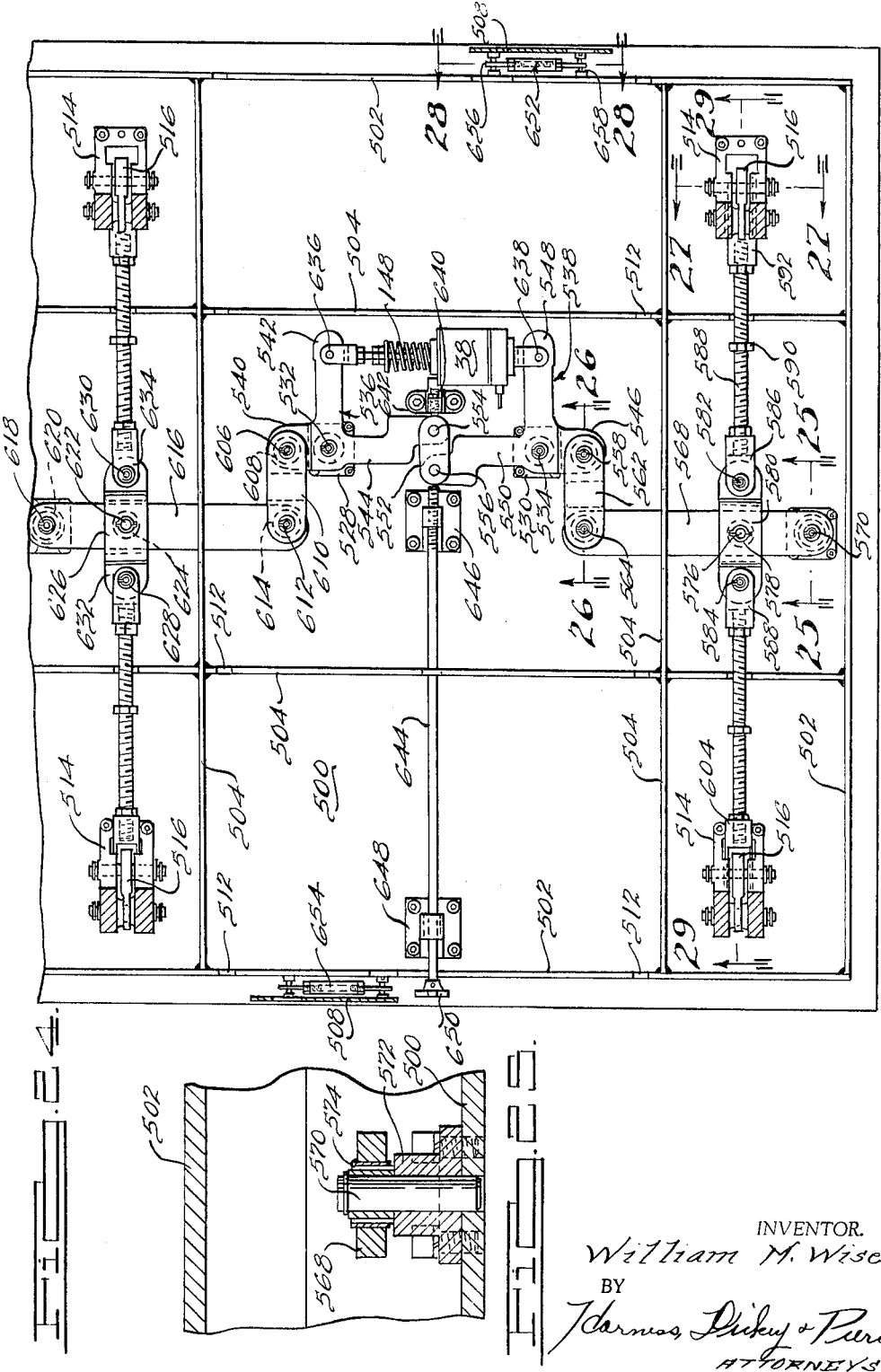

Jan. 25, 1966  W. M. WISE  3,231,035
LOAD WEIGHING SYSTEM
Filed Oct. 28, 1963  11 Sheets-Sheet 10
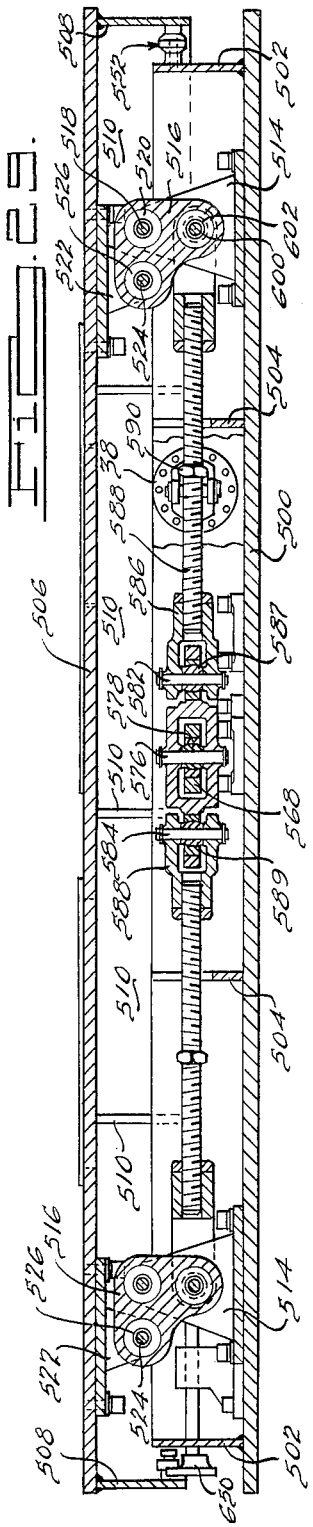
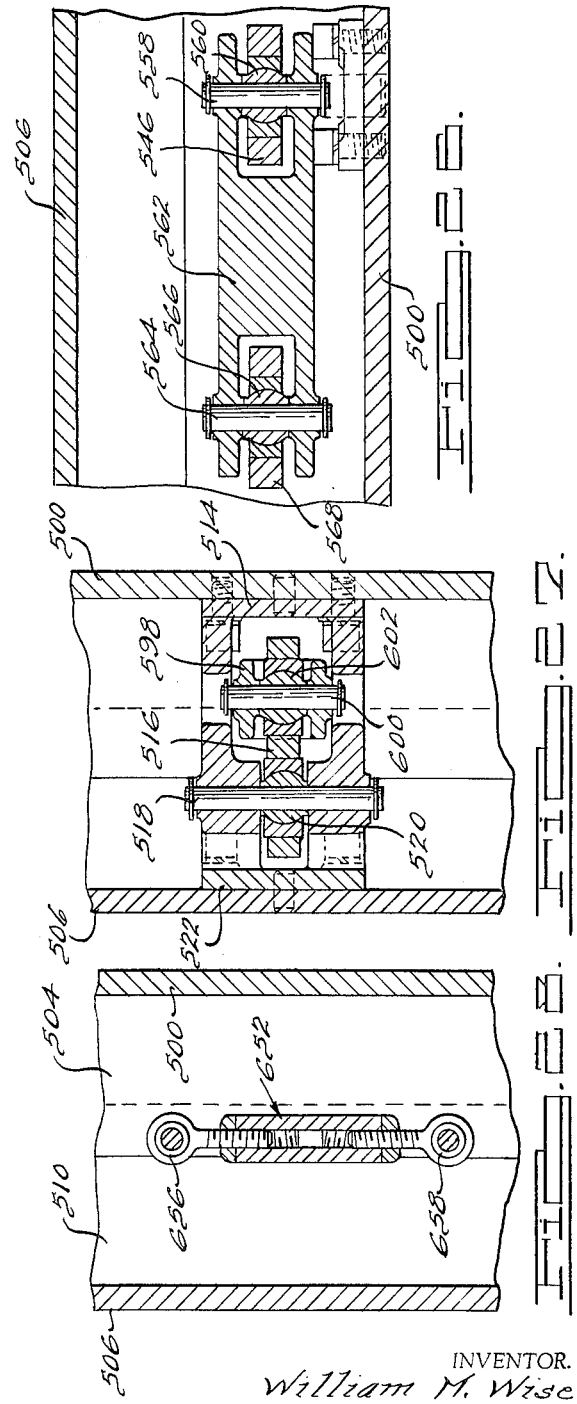
INVENTOR.
William M. Wise
BY
Karnes, Dickey & Pierce
ATTORNEYS INVENTOR.
William M. Wise
BY
Carness, Dickey & Pierce
ATTORNEYS.

United States Patent Office 3,231,035
Patented Jan. 25, 1966

3,231,035
LOAD WEIGHING SYSTEM
William M. Wise, Bloomfield Hills, Mich., assignor to Hydroway Scales, Inc., Madison Heights, Mich., a corporation of Michigan
Filed Oct. 28, 1963, Ser. No. 320,254
40 Claims. (Cl. 177—139)

This invention relates to load weighing systems, and more particularly to an improved load weighing system especially adapted for installation upon various types of material handling equipment, such as fork-lift trucks, conveyors and the like, to enable a load to be both weighed and transported by such equipment, and also for various types of heavy duty scales, such as platform scales and the like. This application is a continuation-in-part of my copending application Serial No. 72,762, filed November 30, 1960, now abandoned.

With industrial and heavy duty equipment of this type rough use and abuse are the rule rather than the exception, and therefore it is often very difficult to achieve a long, trouble-free, reliable and accurate life with such equipment. Furthermore, heavy loading on the forks of a lift truck incorporating a load weighing system, on a conveyor scale or a platform scale, will as a practical matter usually cause a certain amount of distortion in the form of flexure of various components forming a part of or associated with the weighing system, even though all such components are of the stiffest practical construction. Such distortion may in fact be in excess of the motion which is required in order to actuate the sensing element of the weighing system, thus seriously impairing accuracy. Also, in previous weighing systems for such equipment, difficulty has often been encountered due to static friction and other factors which interfere with the attainment of proper accuracy and sensitivity, and this difficulty is aggravated by losses of accuracy and sensitivity resulting from the unavoidable distortion of the parts and rough service to which such equipment is commonly subjected.

It is therefore an important object of the present invention to provide a weighing system which not only is compact and has high initial sensitivity and accuracy, but which is also capable of withstanding the rough service, vibration, high impact loadings, contaminated atmospheric conditions, and other abuse commonly encountered in the operation of most material handling equipment and heavy duty scales, while maintaining its high initial accuracy and sensitivity for long periods of trouble-free service.

Another important object of this invention resides in the provision of an improved weighing system for fork-lift trucks, conveyors, heavy duty platform scales and the like which has high initial sensitivity and accuracy, and which is so designed as to be capable of maintaining such characteristics even under severe abuse, and despite substantial distortion of the parts which may occur in normal service.

A further object is to provide an improved weighing system for such equipment which is capable of being actuated in accordance with the weight of any load supported thereby without its accuracy and sensitivity being affected by the deleterious effects of distortion of components in the weighing system, even where the distortion substantially exceeds the motion transmitted through the weighing system's linkage and lever system to the sensing element thereof, and which is provided with convenient means for making adjustments and calibrations of the system.

In one of its aspects, the present invention is substantially independent of the particular types of load sensing and counterbalancing means employed, although it is of particular utility in systems wherein the movement or distortion of the sensing and counterbalancing means during weighing is slight, as for example, where hydrostatic cells or electronic strain gauges are employed. In another aspect, it is an object of the invention to provide an improved weighing system for such equipment which is especially adapted for use with sensing and indicating means corresponding generally to those disclosed in my previous Patents Nos. 2,643,873 and 2,920,654. In such prior patents are disclosed hydraulic weighing scales and means for charging and conditioning the same, the principles of which the present invention aims to adapt with unique effectiveness to the simultaneous weighing and lifting and/or transporting of loads on lift trucks, conveyors, heavy duty platform scales and the like.

It is still another object of the invention to provide an improved load weighing system for installation on a fork-lift truck which will weigh the loads handled by the truck with a high degree of accuracy and sensitivity regardless of where the load is located on the forks, which is extremely compact, rugged and fool-proof, and which will maintain its high degree of accuracy and sensitivity.

Yet another object of the invention resides in the provision of an improved load weighing system for installation with an independently supported section of conveyor track which will weigh loads being transported by the conveyor across the section with a high degree of accuracy and sensitivity regardless of where the load is located on the section, which is extremely compact, rugged and fool-proof, and which will maintain its high degree of accuracy and sensitivity. A related object concerns the provision of such a weighing system which does not require displacement of the weighing section of track to an extent which might interfere with the normal operation of the conveyor.

Still another object of the invention resides in the provision of an improved load weighing system for installation in heavy duty platform scales and the like which will weigh loads handled by the scales with a high degree of accuracy and sensitivity regardless of where they are located on the platform, which is extremely compact, rugged, and fool-proof, and which will maintain its high degree of accuracy and sensitivity.

Another object of this invention resides in the provision of an improved load weighing system wherein the load sensing and counterbalancing means may include a hydrostatic cell, electronic strain gauges, or pivoted levers with poise and/or counter balancing springs. A related object concerns the provision of an adjustable poise assembly which may be added to the weighing system of the present invention to increase the flexibility and range thereof.

Further objects, features, and advantages of this invention will become apparent from consideration of the following description, the appended claims and the accompanying drawings, in which:

FIGURE 1 is a side elevational view of a conventional fork-lift truck equipped with a weighing system incorporating the principles of the present invention;

FIGURE 2 is a fragmentary top plan view looking substantially along line 2—2 of FIGURE 1;

FIGURE 3 is a vertical enlarged sectional view taken substantially along line 3—3 of FIGURE 4;

FIGURE 4 is a vertical sectional view of the principal components of the weighing system mechanism, removed from the truck, taken substantially along line 4—4 of FIGURE 3;

FIGURE 5 is a plan view of the weighing mechanism removed from the truck and partly broken away;

FIGURE 6 is a vertical sectional view showing a second embodiment of the present invention, taken substantially along line 6—6 of FIGURE 8;

FIGURE 7 is a sectional detail view taken substantially along line 7—7 of FIGURE 8;

FIGURE 8 is a vertical sectional view generally similar to FIGURE 4 but showing the modified structure;

FIGURE 9 is a plan view similar to FIGURE 5 but showing the modified structure;

FIGURE 10 is a substantially diagrammatic sectional elevation of the indicating assembly employed with the embodiments of FIGS. 1–9;

FIGURE 11 is a vertical sectional view generally similar to FIGURE 4, taken substantially along line 11—11 of FIGURE 13, but showing a third embodiment of the present invention;

FIGURE 12 is a fragmentary top plan view looking substantially along line 12—12 of FIGURE 11;

FIGURE 13 is a side elevational view looking substantially in the direction of arrow 13 of FIGURE 11;

FIGURE 14 is a vertical sectional view taken substantially along line 14—14 of FIGURE 11;

FIGURE 15 is a vertical sectional view taken substantially along line 15—15 of FIGURE 11;

FIGURE 16 is a vertical sectional view taken substantially along line 16—16 of FIGURE 11;

FIGURE 17 is a horizontal sectional view taken substantially along line 17—17 of FIGURE 11;

FIGURE 18 is a vertical sectional view taken substantially along line 18—18 of FIGURE 11;

FIGURE 19 is a diagrammatic front plan view of the indicating and load counterbalancing assembly employed with the embodiment of FIGS. 11–23;

FIGURE 20 is a vertical sectional view generally similar to FIGURE 11 but showing as a fourth embodiment an adjustable poise counterweight assembly which may be incorporated in a weighing system of the present invention;

FIGURE 21 is a vertical sectional view taken substantially along line 21—21 of FIGURE 20;

FIGURE 22 is a vertical sectional view taken substantially along line 22—22 of FIGURE 20;

FIGURE 23 is a vertical sectional view taken substantially along line 23—23 of FIGURE 20;

FIGURE 24 is a top plan view of a fifth embodiment in the form of a heavy duty platform scale having a weighing system incorporating the principles of the present invention, the platform thereof being cut away for clarity;

FIGURE 25 is a vertical sectional view taken substantially along line 25—25 of FIGURE 24;

FIGURE 26 is a vertical sectional view taken substantially along line 26—26 of FIGURE 24;

FIGURE 27 is a vertical sectional view taken substantially along line 27—27 of FIGURE 24;

FIGURE 28 is a vertical sectional view taken substantially along line 28—28 of FIGURE 24;

FIGURE 29 is a vertical sectional view taken substantially along line 29—29 of FIGURE 24;

Figure 30:
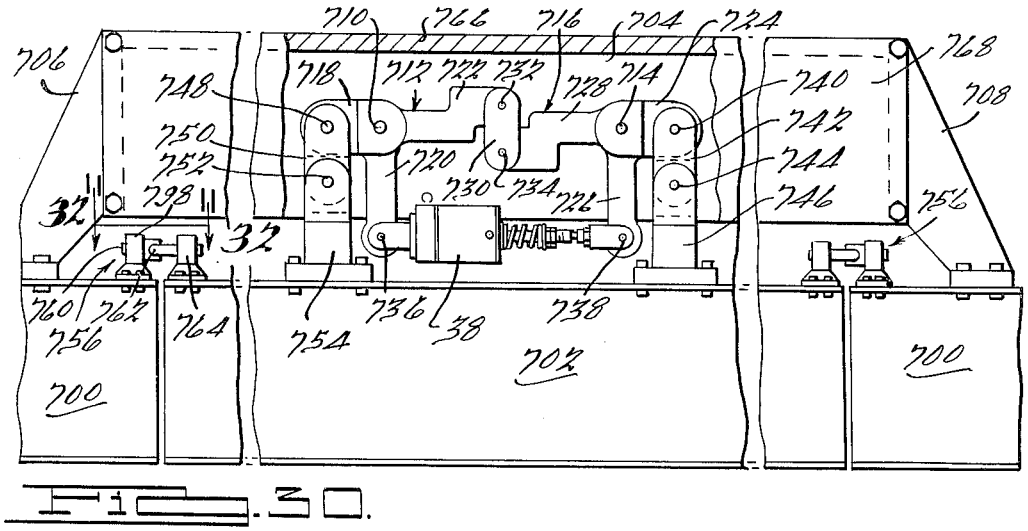
FIGURE 30 is a shortened side elevational view, partly in section, of a sixth embodiment in the form of a conveyor track having a weighing system incorporating the principles of the present invention.

Generally speaking, the weighing system of the present invention comprises load receiving means, load sensing and counterbalancing means and load indicating means. However, as will become apparent, within the concept of the novel system many variations of these main components are possible. For example, the load receiving means may include the forks of a conventional fork-lift truck, an independently supported section of a conventional conveyor track, the platform of a heavy duty platform scale, and so on. The load sensing and counterbalancing means may comprise swinging or pivoted levers with a counterbalancing spring and/or poise, a hydrostatic cell, a flexible member having strain gages thereon, and the like. Similarly, the load indicating means may be of virtually any known type. Furthermore, any combination of these types of major components may be used in a single weighing system, depending on the requirements of the application for which the weighing system is chosen.

More specifically, weighing systems incorporating the principles of the present invention comprise a pair of fulcrumed levers each constructed so as to have a load supporting moment arm, an equalizing moment arm, and a reaction moment arm, although in certain embodiments disclosed herein the equalizing moment arm coincides with the reaction moment arm. In the context of the present specification and claims therefore the term "load-supporting arm," "equalizing arm," and "reaction arm" are all meant in the sense of moment arms rather than the physical arms which define these moment arms. The two fulcrumed levers are so arranged that the load being weighed is supported jointly by the levers, at the ends of the two load supporting moment arms thereof. Also the levers are articulated with one another for movement in both directions at the ends of the respective equalizing moment arms, and the sum of the moments on both levers created by the load is sensed and counterbalanced by the sensing and counterbalancing means acting on the levers at the ends of the reaction moment arms. In applications in which the fulcrumed levers are of such a configuration that the reaction moment arms move in opposite directions upon the application of a load, the sensing and counterbalancing means may act between and in response to relative movement of the reaction moment arms. In applications in which the reaction moment arms move in substantially the same direction upon application of a load the sensing and counterbalancing means may function in response to movement of the ends of the reaction arms with respect to some fixed reference point in the system.

Another aspect of this invention resides in the use of spherical bearings between certain components of the system for preventing distortion of the components from adversely affecting weight readings. Such bearings provide unrestricted limited universal movement between these components so that only those forces introduced into the system by a load will be transmitted to the indicating means. In the present specification and claims the term "unrestricted" means unrestricted relative to the highly restricted movement which distortion might produce in systems where the components were interconnected by fixed axis type bearings.

In the present specification and drawings there are disclosed, for exemplary purposes, a first embodiment adapted for use on fork-lift trucks incorporating a hydrostatic cell sensing and counterbalancing means, a second embodiment also for use on fork-lift trucks and incorporating a hydrostatic cell sensing and counterbalancing means but having fulcrumed levers of modified configuration, a third embodiment for use on fork-lift trucks having a pivoted lever and spring sensing and counterbalancing means, a fourth embodiment for use on fork-lift trucks similar to the third embodiment but having adjustable poise counterbalancing means added thereto, a fifth embodiment for use on heavy duty platform scales and the like, and a sixth embodiment for use in conveyor systems.

Referring to FIGURES 1 and 2 of the drawings, reference character 10 designates, generally, a fork-lift truck having a vertical boom 12 pivotally mounted at its lower end upon the truck structure for swinging movement about a transverse axis in a conventional manner. Fork structures generally designated 14 are carried on my improved weighing system generally designated 15 which is operatively connected to the vertical boom 12.

Each fork structure 14 is of conventional L-shaped form, as shown, and disposed with a horizontal arm 16 capable of being entered beneath a load to be lifted and transported by the truck 10 and a vertical arm 18 adapted to be connected to the load weighing system 15. The truck as shown is provided with conventional fork-receiving bracket means 25, and similar bracket means 22 are provided on the front plate 20 of my improved weighing mechanism, to similarly receive the lifting forks, in conventional fashion, when the weighing system is installed, the weighing system 15 being adapted to be supported by the regular fork bracket 25 of the truck. Bracket 22 extends laterally across and is fastened to front plate 20 of the weighing system 15 by suitable fastening means. The forks 14 are thereby conventionally adjustably supportable in the usual manner but loads thereupon are transmitted through the interposed weighing system 15 to the truck 10.

The front plate 20 is operatively supported on a back plate 24 of the weighing system 15 in a manner to be described. Top cleats 21 and bottom cleats 23 are fastened on each side of the rear of plate 24 and are adapted to engage the bracket 25 fastened to the lifting carriage 26 of the lift truck. The carriage 26 is, of course, mounted for vertical movement along the boom 12 in any known manner as employed on conventional fork-lift trucks. Means employed for this purpose form no part of this invention.

The bracket 25 and cleats 21, 23 permit the load weighing system 15 to be quickly and easily mounted on the truck 10. The truck, with forks removed, is driven up to the load weighing system 15 so that the bracket 25 is located under the top cleats 21. Then the carriage means 26 is raised so that bracket 25 will engage the top cleats 21. The bottom cleats 23 are then fastened to the back plate 24 so as to engage the bracket 25.

A parallelogram linkage system generally designated 27 supports the front plate 20 from the back plate 24 and permits vertical movement of the front plate for actuating the sensing element of the weighing system, the sensing element, in the preferred construction shown, comprising the pressure cell of a hydraulic weighing system.

When a load is placed on the fork or forks 14, front plate 20 will be displaced downwardly with respect to back plate 24. This relative displacement occurs through hinging movement of the upper and lower links 36, 37 of the parallelogram linkage 27. Spherical bearings 34 mounted in brackets 30 pivotally connect the ends of the links to the front plate 20 and the back plate 24 to provide unrestricted limited universal movement therebetween. It will be appreciated that the total vertical travel of the front plate 20 relative to the back plate 24 which occurs during a weighing operation is very slight.

In addition to moving the front plate 20 downwardly with respect to the back plate 24, heavy loading will effect a certain amount of distortion of the front plate 20, back plate 24, and other components, even though all of such components are of the stiffest practical construction. Such distortion may in fact be in excess of the motion transmitted through the linkage and lever system to the sensing element and would adversely affect the weighing system's accuracy if it were permitted to cause misalignment of the parts or binding in the bearings, or to change the effective lengths of any of the lever arms. However, the spherical bearings 34 and other spherical bearings in the linkage and lever system prevent any such effects by rotating to compensate for the distortion. The only motion transmitted through the linkage and lever system to the pressure cell is the relative vertical movement between the front plate 20 and the back plate 24, and the resistance to such movement interposed by the bearings remains substantially constant despite any misalignment which may occur due to unavoidable distortion.

In the embodiment shown in FIGURES 3–5, the vertical displacement between the front plate 20 and the back plate 24 is transmitted to a floating hydraulic pressure cell generally designated 38 which is mounted between the front plate 20 and the back plate 24 by a lever system generally designated 28. The lever system 28 is further broken down to a right hand lever portion 40 and a left hand lever portion 42 which respond to vertical motion of plate 20 with respect to plate 24 caused by the resultant weight acting on the right hand and left hand forks 14, respectively. The right and left hand directions are taken with respect to a truck operator looking forwardly. The right hand lever portion 40 comprises a fixed support bracket 43 fastened to the rear plate 24 which carries a rigid forwardly projecting pin 44 for a support bearing 45 upon which a three-armed lever generally designated 46 is fulcrumed. This bearing is of the 360° type in that it is capable of 360° of rotation, but is limited to rotation about a single fixed axis. Lever 46 consists of an outwardly extending horizontal load-supporting arm 50, an inwardly extending horizontal equalizing arm 62, and a depending reaction arm 64. Although the fulcrum bearing 45 is of the anti-friction type, it is non-spherical, so that it confines movement of lever 46 to rocking about the fixed axis defined by pin 44, which axis is perpendicular to the back plate 24. Bearing 78, which is the left hand counterpart of bearing 45, similarly furnishes a fulcrum axis for a left hand, three-armed lever generally designated 80, the fulcrum axis of which is also perpendicular to the back plate 24. The other bearings in the lever system 28 are all preferably of the spherical type.

A spherical bearing 48 is carried by the outer end of arm 50 of the lever 46 and supports the bifurcated upper end of a suspension link generally designated 52 hung on a pin 53 extending through the bearing. The clearances of clevis arms 54 and 56 on suspension link 52, and the location of the bearing 48, permit limited universal swinging movement of the link 52. A spherical bearing 58 is pivotally supported by and similarly centered with respect to the lower end of the suspension link 52, and supports the front plate 20 by a pin 59 which extends through the inner race of bearing 58 and is fixed to a suspension bracket 60 which is rigidly connected to the front plate 20.

A spherical bearing 66 is carried by the inner end of the arm 62 and connects the end of the lever 46 to articulating link elements 68 and 70 fitted on a pin 67 extending through the bearing. Link elements 68, 70 articulate the ends of the equalizing lever arms 62, 94, being connected in analogous fashion by a spherical bearing 96 to the inner end of the arm 94 of the left hand lever 80. The clearance of the links 68 and 70 and the location of the bearings 66, 96 permit limited universal movement between the levers 46, 80 and the links 68 and 70.

Similarly a spherical bearing 74 is carried by the lower end of the arm 64 and has a pin 75 extending through the inner race thereof for supporting the bifurcated outer end of a substantially horizontal arm 72 which is rigidly connected to the cylinder 110 of pressure cell 38. The clearance between the bifurcated end of arm 72 and the bearing 74 permits limited universal movement of the arm 72 and lever 46 with respcet to one another.

The left hand lever portion 42 is the counterpart of the right hand portion except that the inner end of the equalizing arm 94 of lever 80 is disposed downwardly rather than in the upward direction of its right hand counterpart 62. Therefore, the left hand lever portion 42 comprises a fixed support bracket 76 fastened to the rear plate 24 which carries a rigid, forwardly projecting pin 77 for fixed axis support bearing 78 upon which the three-armed lever 80 is fulcrumed. Lever 80 consists of an outwardly extending horizontal load-supporting arm 84, an inwardly extending horizontal equalizing arm 94, and a depending reaction arm 98. A spherical bearing 82 is carried by the outer end of arm 84 of the lever 80 and supports the bifurcated upper end of a suspension link generally designated 86 on a pin 87 extending through the bearing. The clearances of the clevis arms 88 and 89 of the suspension link 86 and location of the bearing permit limited universal swinging movement of the link 86. A spherical bearing 91 is pivotally supported by and similarly centered with respect to the lower end of suspension link 86 and supports the front plate 20 in a manner similar to its right hand counterpart 53 through a pin 92 and a suspension bracket (not shown) which is the left counterpart of suspension bracket 60. A spherical bearing 100 is pivotally supported by and similarly centered with respect to the lower end of the reaction arm 93 and has a pin 99 extending through the inner race thereof for supporting the bifurcated outer end of a substantially horizontal arm 102. The spherical bearing 96 is pivotally supported by and similarly centered with respect to the inner end of the equalizing arm 94 having a pin 95 extending through the inner race thereof for supporting the lower ends of the links 68 and 70 which extend to the right hand lever 46 thereby interconnecting the action of the left hand and right hand lever portions. The clearance of the links 68 and 70 and the location of the bearing 96 permits limited universal movement between the lever 80 and the links 68, 70. Thus, limited independent movement is permitted between levers 46, 80 except in their movement on the fulcra 45, 78.

The weighing system in accordance with principles of the present invention is arranged in a very compact manner even though the means for supporting the load and for actuating the sensing means is of very rugged construction and incorporates highly flexible means for removing the effects of distortion in the system and for equalizing the loading. The compactness is such that my improved weighing system does not interfere with the usefulness of the truck itself or materially affect its lifting capacity. It will be seen that the coplanar disposition of the levers, links and sensing means, and the manner in which the parts are interfitted, contribute greatly to such compactness.

The vertical displacement of the front plate 20 caused by loading on the forks 14 causes the suspension links 52, 86 to move downwardly thereby moving the load-supporting arms 50, 84 of the three-armed levers 46, 80 downwardly and around the support bearings 45, 78. At the same time, spherical bearings may rotate to compensate for any distortion which may be caused by heavy loading or other distorting influences. The compensating movement by the spherical bearings prevents distortion in the front and back plates 20, 24 from causing misalignment of the parts or a change in the effective lengths of any of the lever arms. The downward movement of the arms 50, 84 moves the equalizing arms 62, 94 upwardly and the reaction arms 64, 98 inwardly with respect to each other. The links 68 and 70 on the arms 62, 94 effectively interconnect and equalize the operations of the left hand and the right hand lever portions. For instance, referring to FIGURE 2, and assuming that a single weight is placed on the left fork 14 with no weight being placed on the right fork 14, the equalizing arm 94 of lever 80 will be moved in an upward direction. This upward movement is transmitted through links 68 and 70 to the equalizing arm 62 of the lever 46 causing it also to move upwardly. The equalizing arms 62 and 94 will move upwardly to the same degree thereby causing the forces acting in the lever system 28 to be in equilibrium. Since the upward movements of the arms 62 and 94 are equal, it is obvious that the inward movements of the reaction arms 64 and 98 are also equal, causing a pressure increase within the single hydraulic pressure cell 38 which is directly proportioned to the load on forks 14, even though such loading be predominantly or entirely on a single fork as in the illustrative instance of a load applied only to the left fork, as described. Thus, no matter where a load is placed on the forks 14 the lever system 28 will equalize the effect of such loading on the pressure cell 38 to thereby achieve an accurate indication of the loading.

A common manual lockout screw 103 carrying a handle 106 is adjustably threaded in a bracket 105 mounted above the links 68, 70 on the front of the back plate 24. Screw 103 is turned down by the handle 106 to bear against the equalizing arm 62 in order to prevent movement of the lever system 28 during periods in which the load weighing system is not being used.

During the weighing operation, load sensing and counterbalancing means react against the reaction arms 64, 98 in directions opposite to those in which they are urged by the loading on the arms 14. The load sensing and counterbalancing means comprises the pressure cell generally designated 38 which is connected to a weight indicating assembly generally designated as 164. As the reaction arms 64, 98 bear inwardly toward pressure cell 38 a pressure is exerted on a pressure gage in the indicating assembly 164. The hydrostatic pressure in the pressure cell 38 is of course maintained by the pressure gage in the indicating assembly which gage may be of the Bourdon tube or other suitable type and which, as will be appreciated, counterbalances the load.

The details of a preferred pressure cell 38 are illustrated in FIGURE 4. A cylindrical housing 110 is provided, one end of which is closed by a right end cap or cylinder head 112. The horizontal arm 72 connected to the reaction arm 64 is attached along with the head 112 to the housing 110 by any suitable fastening means. The head 112 has a hub portion 114 extending into the housing 110 with a groove 116 formed therein which receives a seal 118, illustrated as an O-ring. A left end cap 120 is mounted on the opposite end of housing 110 extending therein. The cap 120 has an aperture 124 therethrough which slidingly receives a piston rod 126. The piston rod 126 is slidingly supported by a recirculating ball bearing assembly, which may be of a commercially available type, and which includes a plurality of balls 130 arranged in several longitudinal series and supported in a sleeve element 132 within cylinder 110. The piston rod 126 is rigidly connected to arm 102 at its outer end, and at its inner end axially abuts against a floating piston 134 which slidingly engages the inner wall of the cylinder 110 and has an annular groove 136 therein for carrying an annular seal 138 illustrated as an O-ring, for preventing leakage between the piston and cylinder. It should be noted that the piston 134 is separate from the piston rod 126. This construction eliminates the possibility of pulling a partial vacuum in the scale registering assembly when any force is exerted upon the reaction arms 64, 98 tending to move them outwardly.

An adjustable spring assembly generally designated 142 is mounted on the piston rod 126 and comprises spring abutment cups 144 and 146 which are biased away from one another by a compression spring 148. The spring cup 144 bears against the left end cap 120 of the cylinder 110, and the spring cup 146 is adjustable by a nut 150 to vary the spring force. The biasing action of spring 148 compensates for the weight of the front plate 20 and forks 14. The end cap 120 has a counterbore therein which receives an annular seal 152 which is in sealing engagement with piston rod 126.

The inward forces exerted upon the reaction arms 64, 98 due to loads upon the forks will cause piston 134 to exert a pressure upon the liquid in cylinder space 140 proportional to the loading. Such pressure is transmitted to the weight indicating assembly 164 through a flexible high pressure hydraulic tube 158 which is coupled as by a screw threaded union 160 to the cylinder 110 and communicates through port 111 within cylinder space 140.

The indicating assembly 164 has a suitable pressure gage 165 and a dial 167 with its scale calibrated in units of weight and is mounted on tubular arm 166 carried by the rear plate 24, to which the arm is fastened by any suitable means. The arm extends upwardly and rearwardly to a position to afford the operator of the fork-lift truck a clear view of the indicator at all times.

The tube 158 preferably extends upwardly through the tubular arm 166 to the indicating assembly 164.

The pressure gage 165 in the indicating assembly 164 produces a counterbalancing pressure in pressure cell 38 which acts against the reaction arms in directions opposite to those in which they are urged by the loading on the arms 14. The indicating assembly, which forms no part of my present invention, is of the same general construction and operation as disclosed in my previous Patent No. 2,643,873, and so requires no detailed description here.

A modification or second embodiment of the present invention is illustrated in FIGURES 6–9 and comprises a lever system generally designated 170 having a right hand portion generally designated 172 and a left hand portion generally designated 174 for transmitting the right hand vertical movement and the left hand movement between plates 20 and 24, respectively. The same convention for direction is used here as was used in description of apparatus in FIGURES 1–5.

This embodiment differs from the first embodiment particularly in the construction and arrangement of the spherical bearings, and by eliminating the links 52, 68, 70 and 86. To prevent binding due to flexure or distortion when the lever system 28 is actuated by the downward movement of front plate 20 unique eccentric bearing arrangements are utilized in such manner as to function similarly to the first embodiment without need for the vertical links 52, 68, 70, 86.

The right hand portion 172 of the lever system comprises a fixed support bracket 176 fastened to the rear plate 24 which carries a rigid, forwardly projecting pin 175 for a support bearing 178 upon which a three-armed lever generally designated 180 is fulcrumed. Lever 180 consists of an outwardly extending horizontal load-supporting arm 186, an inwardly extending horizontal equalizing arm 188, and a depending reaction arm 190. Although the fulcrum bearing 178 is of the anti-friction type, it is non-spherical, so that it confines movement of the lever 180 to rocking about the fixed axis defined by the pin 175 which is perpendicular to the back plate 24. Bearing 202, which is the left hand counterpart of the bearing 178, similarly furnishes a fulcrum axis for a left hand three-armed lever 204, the axis of which is also perpendicular to plate 24. The remaining bearings in the lever system 170 are all preferably of the spherical type. A spherical bearing 182 is carried by the outer end of arm 186 of the lever 180, the inner race of which supports a hub portion 184. The hub portion 184 has a pin 185 eccentrically and rotatively mounted therein which carries the front plate 20 through a suspension bracket 187 which is rigidly fastened thereto. The spherical bearing 182 is centered with respect to the arm 186 and permits limited relative universal movement between the pin 185 and lever 180. A spherical bearing 192 is pivotally supported by and similarly centered with respect to the inner end of the equalizing arm 188, the inner race of which carries a hub portion 194 having a pin 195 eccentrically mounted therein which articulates the inner ends of the equalizing arms 188 and its left hand counterpart 215. A spherical bearing 196 is pivotally supported by and similarly centered with respect to the lower end of the reaction arm 190, the inner race of which carries a pin 197 which supports the bifurcated outer end of a substantially horizontal arm 198 which is connected to a pressure cell 199 which is identical to the cell 38 in the first embodiment.

The left hand portion 174 of the lever system 170 transmits the relative movement occurring between the left hand side of the front plate 20 and the back plate 24 and comprises a fixed support bracket 200 fastened to the rear plate 24 which carries a rigid, forwardly projecting pin 201 for a support bearing 202 upon which the three-armed lever 204 is fulcrumed. Lever 204 consists of an outwardly extending horizontal load-supporting arm 210, an inwardly extending horizontal equalizing arm 215, and a depending reaction arm 218. A spherical bearing 206 is carried by the outer end of arm 210 of the lever 204. The inner race of bearing 206 supports a hub portion 208 and the outer race is located and centered with respect to the arm 210 to permit limited universal movement of the hub 208 and, therefore, of pin 209 with respect to lever 204. The hub portion 208 has a pin 209 eccentrically and rotatively mounted therein which carries the front plate 20 through a suspension bracket 212 which is rigidly fastened thereto. A spherical bearing 220 is pivotally supported by and similarly centered with respect to the lower end of the reaction arm 218 having a pin 219 extending through its inner race for supporting the bifurcated end of an arm 222 which is operatively connected to the pressure cell 199. Clevis arms 214 and 216 of the equalizing arm 215 are coupled by the pin 195 which extends through the hub portion 194 of bearing 192 carried by the equalizing arm 188 for interconnecting the operation of the right and left hand lever portions.

When a load is placed on the forks 14, the load-supporting arms 186, 210 will move downwardly causing the equalizing arms 188, 204 to move upwardly and the reaction arms 190, 218 to move inwardly with respect to each other. The spherical bearings compensate for distortion in substantially the same manner as in the first embodiment of the invention.

The pins 185, 209 are rigidly attached to the front plate 20 so that the spacing between such pins is fixed, while pins 175, 201 are rigidly fixed in position with respect to each other by their attachment to the back plate. Thus it can be seen that in order to permit the front plate 20 to move downwardly, means must be provided to prevent binding between the pins 185, 209 fixedly spaced on the front plate and levers 180, 204 which are supported on the fixed fulcrums 175, 201. Binding is prevented due to the fact that the pins 185, 209 are located in positions displaced from the centers of their respective bearing assemblies 182, 206, such displacement being in a direction substantially perpendicular to the arms 186, 210 by which the bearings 182, 206 are carried (shown as upward displacement in the drawings). Thus, when the levers 180, 204 rock about their respective fulcra 175, 201, although the centers of the bearings 182, 206 tend to move inwardly as the levers 180, 204 move away from a straight line position with respect to one another, the inner hub portions 184, 206 turn with the inner races of bearings 182, 206 to offset the binding forces which would be developed due to the effort to force the pins 185, 209 to also move inwardly, thereby permitting the pins 185, 209 to remain at their fixed distances without binding or the creation of increased friction in the bearings 182, 206.

The articulating bearing 192 is arranged to prevent any binding due to the tendency of the inner ends of the equalizing lever arms 188, 215 to move apart as these lever arms rock away from a straight line colinear relationship. When such movement occurs, the hub portion 194 turns with the inner race of the bearing 192, permitting the levers 180, 204 to rock without binding occurring in the bearing 192. This will be seen to result from the offsetting of the pin 195 in a direction perpendicular to the lever arms 188, 215 (shown as upward displacement in the drawings). During such movement, the center of the bearing 192 which is carried by the inner end of the right hand equalizing arm 188 and the axis of the pin 195 both move away from a vertical central plane so that a line between them would become diagonal, rather than remaining in the vertical relationship which exists when the equalizing arms 188, 215 are colinear.

A parallelogram guide linkage incorporating spherical bearings is preferably also employed in this embodiment to guide the movements of the front plate and these parts may correspond with those disclosed in connection with the first embodiment. A manual lock-out screw corresponding to that of the first embodiment is also employed in this embodiment.

Although spherical bearings are now commercially available capable of withstanding very high loading for long periods of time, if after long usage any looseness develops in the bearing system due to wear of races or anti-friction elements, such wear can easily be eliminated simply by turning the bearing slightly in its support. In view of the fact that the actual angular movement of the rockable components is very slight, all wear is substantially vertical and this can be eliminated by moving the bearings slightly to bring unworn anti-friction elements into the position of highest loading. Such bearings additionally are manufactured with zero tolerance which prevents any accumulated errors in tolerance from affecting the alignment of the lever system.

Any theroetical error which might be introduced into the system by virtue of the fact that the various levers pivot, and hence have changing moment arms, is reduced to a minimum in the present system because the actual displacement of the levers therein in response to full load is extremely small. Positioning the effective center point of the equalizing linkage substantially along the line of the main fulcra and equidistant therebetween also serves to reduce any theoretical error, as well as to increase the weighing sensitivity of the system.

A third embodiment of the present invention is illustrated in FIGURES 11–19. As can be seen, this embodiment is in many respects similar to the first embodiment, like reference numerals being used to designate like parts, except that instead of using a pressure cell as a sensing and counterbalancing means there is provided a swinging or pivoted lever system acting against the usual calibrated spring forming a part of the indicating means.

The main pair of fulcrumed levers are indicated at 300 and 302 and are fulcrumed about pins 304 and 306 respectively, each of which is securely affixed to back plate 24 by means of a support bracket 308. The levers are provided with 360° single axis type bearings 310 receiving pins 304 and 306, respectively. Each of the fulcra thus defined confines the movement of levers 300 and 302 to rocking about the fixed axis of rotation defined by pins 304 and 306, which axes are perpendicular to back plate 24. Teflon washers 311 may be provided to reduce friction. Suspended from the outer end of lever 300, by means of a spherical bearing 312, is a load-suspension link 314. Similarly, there depends the outer end of lever 302, as by means of a spherical bearing 316, a load-suspension link 318. The load-suspension links are mounted to the respective levers in such a manner as to permit unrestricted limited universal swinging movement therebetween. The lower end of load-suspension link 314 has a spherical bearing 320 therein through which passes a pin 322 secured at its outer ends to a pair of brackets 324 and 326 forming a part of front plate 20, whereby front plate 20 is pivotally supported by means of suspension link 314. Suspension link 318 similarly pivotally supports front plate 20 at the opposite end thereof in exactly the same manner, similar reference numerals being used to designate similar parts.

As best seen in FIGURES 11 and 14 the inner ends of levers 300 and 302 are offset vertically in opposite directions from a line extending between the main lever fulcra. The inner end of lever 30 is provided with a spherical bearing 328 and the inner end of lever 302 with a spherical bearing 330. A pivot pin 332 passes through spherical bearing 328 and supports the upper bifurcated end of an articulating link 334 having a lower bifurcated end pivotally connected to lever 302 by means of a pin 336 passing through spherical bearing 330. Levers 300 and 302 and articulating link 324 are thus so arranged so as to permit limited universal movement therebetween. At a point in the center of articulating link 324 there is provided a bearing 338 through which passes a pin 340, the normal axis of which lies substantially equidistant between and in the same plane as fulcra 306 and 304. Supported on the outer ends of pin 340 is a pair of links 342 and 344 through the lower ends of which extends a pin 346, which pin also passes through a single axis bearing 348 in a lever 350. As can thus be seen, the load supporting moment arm of lever 300 extends between fulcrum 304 and the center of bearing 312, its equalizing moment arm between fulcrum 304 and the center of bearing 338, and its reaction moment arm coincident with the latter. The moment arms of lever 302 are similarly arranged. To assist in the minimizing of friction Teflon washers 352 may be provided on pins 340 and 346 between the links secured thereto.

Lever 350, which serves to amplify the very small displacement of levers 300 and 302 upon receipt of a load, is pivoted to back plate 24 by means of a pin 354 supported by a bracket 356 secured to back plate 24 and passing through a single axis bearing 358 adjacent the end of lever 350. Teflon washers 359 may be provided to reduce friction. Adjacent the opposite end of lever 350 there is provided a spherical bearing 360 through which passes a pin 362 supporting a pair of links 364 and 366. Extending through the lower ends of links 364 and 366 is a pin 368 passing through a spherical bearing 370 adjacent one end of another lever 372, for further amplifying the displacement of levers 300 and 302 caused by a load. Lever 372 is fulcrumed to back plate 24 by means of a pin 374 secured thereto and passing through a single axis bearing 376 in lever 372. A spacer 378 may be provided on pin 374 to maintain lever 372 spaced from back plate 24 and Teflon washers 379 may be provided to reduce friction. To the opposite end of lever 372 is pivotally secured a bifurcated link 380 by means of a pin 382 extending between both sides of the link and through a single axis bearing 384 in the end of lever 372. Threadably secured to link 380 is one end of a threaded rod 386 the opposite end of which is threadably secured to an upwardly extending bracket 388 which straddles lever 300. So that the effective length of rod 386 may be readily adjusted and resecured a pair of lock nuts 390 and 392 are provided. Another rod 394 is threadably secured to the upper end of bracket 388 along the same axis as rod 386, a lock nut 396 being provided to secure the parts and yet facilitate adjustment.

Rod 394 extends upwardly to a conventional scale dial mechanism assembly 398, such as indicated diagrammatically in FIGURE 19. For exemplarly purposes the assembly is shown as including a support member 399, and a pair of bearings 401 supporting for reciprocation a rod 403, the lower end of which is affixed, as at 405, to rod 394. Counterbalancing the downward force on rod 403 caused by a load is a calibrated counterbalancing spring 407 extending between the rod and the support member. Rod 403 may be provided with a rack portion 409 adapted to engage a pinion 411 to which is secured a pointer 413 arranged to traverse a scale dial 415. Once the device is calibrated the weight of a load may thereby be read directly in the usual manner.

As can be appreciated, levers 300 and 302 function in exactly the same manner as levers 46 and 80 in the first embodiment, the rocking thereof caused by the placing of a load upon the forks of the lift truck being sensed and amplified by levers 350 and 372 and counterbalanced by calibrated spring 407 in the dial mechanism, rather than by a pressure cell as in the first embodiment. Adjustment and calibration of the weighing system may be easily effected by adjusting the effective lengths of rods 386 and 394. In addition, means are provided to easily facilitate the adjustment of brackets 30 with respect to one another to correct for manufacturing tolerances and small errors and to insure that all of the links 36 and 37 will remain parallel to one another in vertical planes in all positions of the front plate with respect to the back plate, whereby relative movement of the plates will not itself cause any distortion therein and load readings will not vary with the position (front to back) if it is placed on the forks. This adjusting means comprises a pair of eccentric pins 400 extending between the bracket and the plate to which it is secured, as best seen in FIGURES 11 and 14. Pins 400 have a main cylindrical portion 402 extending through the plate and slotted at the end thereof, and eccentric portion 404 closely fitting within a suitable bore in the brackets. As can thus be seen, adjustment of brackets 30 may be easily achieved by simply loosening the bracket mounting bolts, turning each pin 400 with a screw driver inserted in the slot in the end thereof until it is properly positioned, and then re-tightening the mounting bolts. This adjusting means may be used in any application of the present weighing system to a fork-lift truck.

As a protection device to prevent severe sideways jolts from damaging or overdisplacing the weighing mechanism, there may be provided a turnbuckle type check link 417 extending between bracket 419 on back plate 24 and a bracket 421 on front plate 20. To reduce the transmission of distortion a spherical bearing 423 may be provided between link 417 and bracket 419 and a spherical bearing 425 between the link and bracket 421.

A fourth embodiment of the present invention is illustrated in Figures 20–23. This embodiment is exactly the same as that just described except that there has been added thereto an assembly in the form of an accessory for further calibrating, varying and increasing the range of the weighing system. This accessory consists of an added lever and adjustable poise counterbalance. The embodiment differs from the immediately preceding one in that rod 394, instead of extending directly to the scale dial mechanism, is threadably secured to a bifurcated link 406 pivotally secured by means of pins 408 and 410 and bearings 412, respectively, to an internally threaded coupling 414. A lock nut 416 may be provided on rod 394. Threadably secured to one end of coupling 414 is a threaded rod 418, the opposite end of which is threadably secured within a bifurcated link 420 journalled by means of a bearing 422 and pin 424 to another link 426. Lock nuts 428 and 430 may be provided on rod 418. From the top of link 426 there extends a threaded rod 432 into scale dial assembly 398 in the same manner as rod 394 did in the preceding embodiment. A lock nut 434 may be provided on rod 432. From the opposite end of coupling 414 extends another threaded rod 436, the opposite end of coupling 414 extends another threaded rod 436, the opposite end of which is threadably secured to one end of a coupling 438 fulcrumed to back plate 24 by means of a pin 440 secured to the back plate and extending into a bearing 442 in the coupling. A spacer 444 may be provided between back plate 24 and coupling 438 to maintain proper spacing. Rod 436 may be provided with lock nuts 446 and 448. Threadably secured to the opposite end of coupling 438 is another threaded rod 450 which may be secured in place by lock nut 452. Threadably and thus adjustably disposed upon rod 450 is a counterweight or poise 454 whose position may be adjusted and secured by means of lock nuts and 456 and 458. As will be appreciated, this embodiment operates in exactly the same manner as the immediately preceding embodiment of the present invention, except that poise 454 introduces a considerably increased counterbalancing or reactive force into the system, thereby substantially increasing the weight measuring range of the system, all other things being equal. This counterbalancing device is also capable of a considerable range of adjustment.

A fifth embodiment of the present invention is illustrated in Figures 24–29, wherein the present weighing system is adapted for application in a heavy duty platform scale. The scale comprises a flat base 500 having vertically projecting peripheral ribs 502 and intermediate crisscrossing reinforcing ribs 504, and a weighing platform 506 having depending peripheral ribs 508 and intermediate crisscrossing ribs 510. Since ribs 508 and 510 somewhat overlap ribs 502 and 504, suitable notches may be provided in each to eliminate interference, such as indicated at 512. Tightly secured to base 500, substantially adjacent the corners thereof, are four mounting brackets 514 each pivotally supporting a generally L-shaped link 516 by means of a pin 518 passing through a spherical bearing 520 in the corner of the link. Weighing platform 506 is similarly provided with four mounting brackets 522 each supporting a pin 524 passing through a spherical bearing 526 in the upper leg of L-shaped link 516. As can thus be seen, the presence of a weight upon platform 506 will cause each of links 516 to rotate in a counterclockwise direction, as viewed in Figure 29.

Also secured to base 500 are a pair of brackets 528 and 530 supporting pins 532 and 534 supporting for rotation about a single axis levers 536 and 538. Lever 536 has load supporting arm 540, a reaction arm 542, and an equalizing arm 544. Lever 538 similarly has load supporting arm 546, a reaction arm 548, and an equalizing arm 550. An articulating link 552 interconnects the ends of equalizing arms 544 and 550 by means of spherical bearings 554 and 556, whereby limited universal movement is possible between lever 536 and 538. Pivotally secured to load supporting arm 546, by means of a pin 558 and spherical bearing 560, is a load-supporting link 562, at the opposite end of which is pivotally secured, by means of a pin 564 and spherical bearing 566, a lever 568. The opposite end of lever 568 is fulcrumed to base 500 by means of a pin 570 secured to the base by bracket 572 and passing through a single axis bearing 574 in lever 568.

Pivotally secured to lever 568, by means of a pin 576 passing through a spherical bearing 578 in lever 568, is a link 580 having pivotally secured at each end thereof, as by means of pins 582 and 584, links 586 and 588 respectively. Link 586 has a spherical bearing 587 for receiving pin 582, and link 588 a spherical bearing 589 for pin 584. Link 568 is connected by means of a rod assembly 588 having opposite pitch threads at each end and a wrench-engaging nut-like hexagonal member 590 secured thereto to another link 592 pivotally secured by means of a pin 600 and a spherical bearing 602 to the lower leg of the L-shaped lever 516 most adjacent thereto. Link 588 is connected in exactly the same manner to a link 604 connected by means of a pin and spherical bearing to the other lever 516 on the same side of the platform scale.

Pivotally secured to load supporting arm 540, by means of a pin 606 and spherical bearing 608, is a load supporting link 610, at the opposite end of which is pivotally secured, by means of a pin 612 and spherical bearing 614 a lever 616. The opposite end of lever 616 is fulcrumed to base 500 by means of a pin 618 secured to the base by a bracket similar to bracket 572 and passing through a single axis bearing 620 in lever 616.

Pivotally secured to lever 616, by means of a pin 622 passing through a spherical bearing 624 in lever 616, is a link 626 having pivotally secured at each end thereof, as by means of pins 628 and 630, links 632 and 634 respectively. Links 634 and 632 are connected to the two levers 516 on that side of the scale in exactly the same manner that links 586 and 588 are connected to levers 516 on the opposite side of the scale, as described above.

Positioned between reaction arms 542 and 548, pivotally supported thereby by pins 636 and 638 respectively passing through spherical bearings in the end of the arms, is a hydraulic pressure cell 38 identical in all respects to that disclosed in the first embodiment. Pressure cell 38 may be connected to a conventional indicating means, such as indicated in Figure 10. In order to lock the lever system when desired, there is provided an adjustable backup or stop member 640 mounted in a bracket 642 secured to base 500 and adapted to engage the end of equalizing arm 544. On the opposite side of the levers is provided a locking rod 644 threaded at its inner end in a bracket 646 secured to base 500 so that when it is rotated the inner end thereof will urge the ends of equalizing arms 544 and 550 securely against adjustable stop 640. The opposite end of rod 644 passes through a suitable supporting bracket 648 and is provided at its outer end with an easily accessible manually operable scale lockout knob 650.

As a protection device a pair of turnbuckle-type check links 652 and 654 may be provided at each end of the apparatus. One end of each of the check links is secured to peripheral rib 508 of platform 506 by means of a spherical bearing, as at 656, and the other end is secured to peripheral rib 502 of base 500, also by means of a spherical bearing, as at 658.

When a weight is placed upon platform 506 it urges each of levers 516 in a counterclockwise direction and this force is in turn transmitted through rods 588 to levers 568 and 616, the ends of which are both urged towards the right as seen in Figure 24. Levers 536 and 538 are identical to levers 46 and 80 in the first embodiment, and therefore operation of the weighing system is identical to that described in the first embodiment. Spring 148 forming a part of pressure cell 38 is, in this case, adjusted to compensate for the tare load so that a full scale reaching of the actual load may be obtained. Substantially friction-free, zero tolerance spherical bearings are provided between platform 506, levers 516 and base 500, as well as between most of the other major components of the mechanism, thereby providing limited universal movement between these components sufficient to prevent any distortions of the apparatus caused by loading from affecting the weight readings, the principles being the same as discussed in connection with the first embodiment.

The present invention is particularly well suited for application to relatively heavy duty platform scales of the portable type, for several reasons. One is that the extremely compact shape and size of the weighing system is such that a relatively large capacity platform scale, say in the order of 20,000 to 40,000 lbs., can be made in portable form and stand only from ten to twelve inches high. A conventional platform scale of this capacity might stand two or three feet high. Also, portable platform scales are rarely ever used on a perfectly flat surface, and when they are not loads thereon tend to distort them severely. The provision of spherical bearings between substantially all of the major components of the present weighing system, permitting limited universal movement therebetween, serves to prevent any such distortion from affecting load readings, even though the degree of distortion may be greater than the normal displacement of the levers in response to the load. This feature also makes it practical to make a platform scale of very large dimensions, such as capable of weighing an entire truck in a single reaching, since the otherwise intolerable effects of distortion are substantially eliminated by the present invention.

Figure 31:
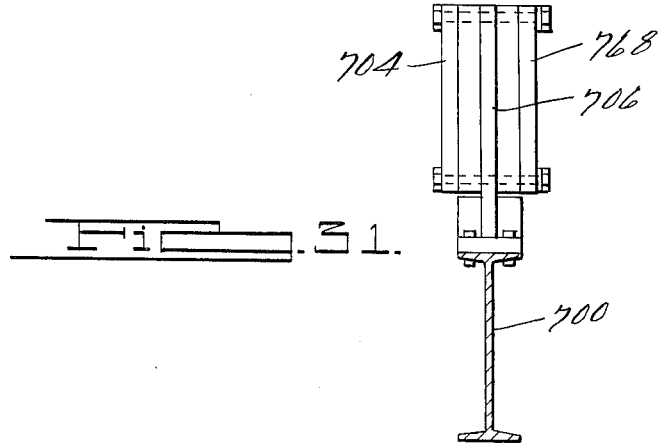
FIGURE 31 is an end view, partly in section, of the apparatus shown in FIGURE 30.
Figure 32:
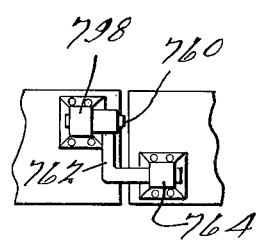
FIGURE 32 is a top plan view looking substantially along line 32—32 of FIGURE 30.

A sixth embodiment of the present invention is illustrated in FIGURES 30-32. In this embodiment the weighing system is adapted for use in connection with a conventional overhead conveyor system, whereby loads transported by the conveyor system may be weighed without removing them from the conveyor or substantially impeding the rate of conveyor travel. As illustrated, the conveyor track, indicated at 700, is of the conventional type, formed of I-beams. At the point in the conveyor line where a weighing operation is desired, an independently supported section of track 702 is inserted, as best seen in FIGURE 30. Above this section may be provided a vertically disposed mounting plate 704 supported at each end by means of a pair of brackets 706 and 708 secured to the main portion of the conveyor track. Fulcrumed to plate 704, by means of a single axis bearing, indicated at 710, is a first main lever 712, and fulcrumed to plate 704, by means of a single axis bearing, indicated at 714, is a second main lever 716. Lever 712 includes a load supporting arm 718, reaction arm 720, and an equalizing arm 722, and lever 716 includes a load supporting arm 724, a reaction arm 726, and an equalizing arm 728. Each of the equalizing arms is joined by a linkage 730 by means of two spherical bearings indicated generally at 732 and 734. Extending between reaction arms 720 and 726 and supported by a pair of spherical bearings, indicated generally at 736 and 738, is a pressure cell 38 identical to that utilized in the first embodiment. Pivotally connected to load supporting arm 724, by means of a spherical bearing indicated generally at 740, is a load supporting link 742, to which is pivotally secured, by means of a spherical bearing indicated generally at 744, a main load supporting bracket 746 rigidly secured to conveyor track section 702 adjacent one end thereof. Pivotally secured to load supporting arm 718, by means of a spherical bearing indicated generally at 748, is a load supporting link 750 having pivotally secured to the lower end thereof, by means of a spherical bearing 752, a load supporting bracket 754 also rigidly secured to conveyor track section 702 adjacent the opposite end thereof.

As can be seen, this weighing system is substantially identical in construction to that disclosed in the first embodiment. Accordingly, it functions in exactly the same manner. As protection means, in order to prevent lateral displacement of the conveyor track 702, there may be provided between each end of the weighing section and the adjoining ends of the main conveyor track check links indicated generally at 756. Each of these check links comprises a bracket 758 secured to the top of the main conveyor track adjacent the end thereof and supporting a pin 760. Pivotally mounted upon pin 760 is an L-shaped arm 762, the opposite end of which extends parallel to the longitudinal axis of the conveyor track and is rotatably received within a bracket 764 secured to the adjacent end of track section 702. Vertical displacement of track section 702 caused by a load thereon is of such small magnitude, in the general order of .015" maximum in an average system, that as a practical matter there is no impediment to the free wheeling of conveyor rollers along the track. If desired, a top cover 766 and a side cover 768 may be secured to mounting plate 704 to protect the weighing system.

Because of the articulated nature of the linkage the weight reading for a given load will be the same regardless of its position along the track section. Consequently, a load reading may be taken while the load is actually moving along track section 702, assuming the section is level and the load is relatively free from any movement in a vertical direction. Thus, the weighing operation does not seriously impede the normal rate of travel of material along the conveyor. The compact size of the weighing system offers additional obvious advantages in systems where conveyors are located close together or very close to a ceiling in order to conserve space.

As discussed above, the linkage mechanism of the present invention lends itself ideally to a number of different types of load sensing and counterbalancing means. In addition to those shown, for example, an electrical load cell may be used. Such a load cell could easily be inserted into the mechanism in lieu of hydraulic cell 38 and might comprise a load-sensitive column upon which resistance strain gages are secured. In operation a load would deform the load-sensitive column and thereby change the resistance of the strain gages in proportion thereto, which change in resistance could easily be measured by any suitable electrically connected instrument in a manner well known in the art. In a system of the present invention only one such load cell would be required since all equalizing is done by the lever mechanism and the only forces transmitted to the sensing and counterbalancing means are those which indicate weight. This is a distinct advantage over weighing systems which incorporate a plurality of such load cells which must be electrically balanced and thus require additional expensive electrical equipment.

Thus, there are disclosed in the above description and in the drawings several exemplary embodiments of the invention which fully and effectively accomplish the objects thereof. However, it will be apparent that variations in the details of construction may be indulged in without departing from the sphere of the invention herein described, or the scope of the appended claims.

What is claimed is:

1. In a weighing scale, a base portion, a load-supporting portion movable under weighing loads with respect to the base portion, a lever system fulcrumed on one of said portions and operatively interconnecting said portions and actuatable by relative movement of said portions, said lever system comprising a pair of levers having their fulcrum axes parallel but spaced from one another, means articulating said levers to each other for controlled simultaneous movement about their fulcrum axes, load sensing means responsive to such movement of said levers, and substantially friction free motion guiding means continuously interconnecting said portions independently of said levers for controlling the movement of said load-supporting portion in a direction substantially parallel to the direction of weight load forces.

2. A scale as defined in claim 1, wherein said articulating means comprises tying means interconnecting predetermined points on said levers and preventing independent rocking movement of said levers in both directions about their fulcra, whereby simultaneous rocking movement of both levers in both such directions is insured, said tying means including a part readily rockable in all directions about a point fixed with respect to one of said levers.

3. A weighing scale as defined in claim 1, wherein said articulating means comprises a spherical antifriction bearing permitting independent relative movements of said levers in directions other than the directions of their controlled simultaneous movement about their fulcrum axes.

4. A weighing scale as defined in claim 1, including universal joint means connecting one of said portions to said levers.

5. A scale as defined in claim 1, wherein said levers are connected to the other of said portions by universal joint means.

6. A scale as defined in claim 1, wherein each of said levers is connected to one of said portions by a spherical antifriction bearing.

7. A scale as defined in claim 1, wherein said motion guiding means includes a plurality of tying elements interconnecting said portions for opposing unwanted movement of said portions toward and away from each other while permitting relative movement of one with respect to the other.

8. A scale as defined in claim 7, wherein said tying elements are connected to at least one of said portions by means permitting controlled universal movement between said tying elements and at least one of said portions.

9. A scale as defined in claim 7, wherein each of said tying elements is conneted to at least one of said portions by a spherical antifriction bearing.

10. A weighing scale as defined in claim 1, wherein said articulating means comprises a spherical antifriction bearing permitting independent relative movements of said levers in directions other than the directions of their controlled simultaneous movement about their fulcrum axes, said spherical bearing including a rotatable part connected to one of said levers by a connecting element eccentric with respect to said bearing.

11. A scale as defined in claim 10, wherein said articulating means comprises a single bearing, said bearing having inner and outer races and said connecting element comprises a pin supported by said inner race in an eccentric position laterally offset from a straight line connecting the fulcra of said levers.

12. A scale as defined in claim 1, wherein said motion guiding means comprises a plurality of parallelogram links, universal joint means in said links permitting universal relative rocking movement of each of said links about a center fixed with respect to said load-supporting portion, said articulating means connecting a point on one of said levers to a point on the other lever, and universal joint means in said articulating means permitting universal rocking movement of said levers in all directions except the directions of their controlled simultaneous movement.

13. Scale means as defined in claim 1, including universal joint means in said motion guiding means and universal joint means connecting the lever system to said portion other than the portion on which the lever system is fulcrumed.

14. A weighing scale as defined in claim 1, including universal joint means in said articulating means.

15. A scale as defined in claim 1, wherein said articulating means and said means connecting said levers to one of said portions comprise universal joints.

16. A scale as defined in claim 1, wherein said articulating means and said motion guiding means comprise universal joint means.

17. A scale as defined in claim 1, including universal joint means connecting one of said portions to said levers and wherein said articulating means includes universal joint means.

18. A scale as defined in claim 1, wherein said guiding means comprises universal joint means.

19. A scale as defined in claim 1, including universal joint means in said articulating means, universal joint means connecting one of said portions to the lever system, and universal joint means in said motion guiding means.

20. A weighing scale as defined in claim 1, including load counterbalancing means carried by and reacting in opposite directions upon said levers.

21. A weighing scale as defined in claim 1, wherein said levers have equalizing arms projecting inwardly toward one another from their fulcrum axes, said equalizing arms being interconnected by said articulating means, said levers also having reaction arms extending laterally therefrom, and load counterbalancing means reacting upon said levers in opposite directions through said reaction arms.

22. A weighing scale as defined in claim 1, wherein said levers have equalizing arms projecting inwardly toward one another from their fulcrum axes and interconnected by said articulating means, said levers also having reaction arms extending laterally therefrom, and load counterbalancing means reacting upon said levers in opposite directions through said reaction arms, said load counterbalancing means including a resiliently distortable element carried by and between said reaction arms.

23. In a weighing scale, a base portion, a generally planar load-supporting portion movable under weighing loads with respect to the base portion, a lever system fulcrumed on one of said portions and operatively interconnecting said portions and actuatable by relative movement of said portions, said lever system comprising a pair of levers having their fulcrum axes parallel but spaced from one another, said axes being perpendicular to said planar load-supporting portion, means articulating said levers to each other for controlled simultaneous movement about their fulcrum axes, load sensing means responsive to such movement of said levers, and motion guiding means continuously interconnecting said portions independently of said levers.

24. A scale as defined in claim 23, wherein said portions comprise spaced parallel plates and said levers are located between said plates and are fulcrumed on one of the plates.

25. A scale as defined in claim 23, wherein said portions comprise spaced parallel plates and said levers are located between said plates and are fulcrumed on one of the plates, said motion guiding means including a plurality of tying elements interconnecting said plates for maintaining them substantially parallel to one another while permitting relative movement of one with respect to the other.

26. A scale as defined in claim 25, wherein said tying elements are connected to at least one of said plates by means permitting controlled universal movement between said tying elements and said one of said plates.

27. A scale as defined in claim 26, wherein check linkages means is provided between said two plates for limiting the relative movement thereof to a direction substantially parallel to the direction of application of weight load forces on said load supporting portion.

28. A scale as defined in claim 27, wherein said check linkage means is connected to at least one of said plates by universal joint means.

29. A scale as defined in claim 25, wherein adjusting means is provided for adjusting the position of attachment of at least one of said tying elements to at least one of said plates.

30. In a weighing scale, a base portion, a load-supporting portion movable under weighing loads with respect to the base portion, a lever system fulcrumed on one of said portions and operatively interconnecting said portions and actutable by relative movement of said portions, universal joint means connecting said lever system to at least one of said portions, load sensing means responsive to such actuation of said lever system, and substantially friction free motion guiding means continuously interconnecting said portions independently of said lever system.

31. A scale as defined in claim 30, wherein said guiding means includes universal joint means.

32. A scale as defined in claim 31, wherein both of said universal joint means comprise spherical antifriction bearings.

33. A scale as defined in claim 30, wherein said universal joint means comprises a spherical antifriction bearing.

34. A scale as defined in claim 30, wherein check linkage means is provided between said portions for limiting the relative movement thereof to a direction substantially parallel to the direction of application of weight load forces on said load supporting portion.

35. A scale as defined in claim 34, wherein said check linkage means includes universal joint means.

36. A scale as defined in claim 30, wherein said portions comprise spaced parallel plates, said lever system being located between said plates, and wherein said motion guiding means comprises a plurality of parallelogram links, and universal joint means in said links permitting universal relative rocking movement of each of said links about a center fixed with respect to at least one of said plates.

37. A scale as defined in claim 36, wherein check linkage means is provided between said plates for limiting the relative movement thereof to a direction substantially parallel to the direction of application of weight load forces on said load supporting plate.

38. A scale as defined in claim 36, wherein adjusting means is provided for adjusting the position of attachment of at least one of said parallelogram links to at least one of said plates.

39. In a weighing scale, a base portion, a load-supporting portion movable under weighing loads with respect to the base portion, a lever system fulcrumed on one of said portions and operatively interconnecting said portions and actutable by relative movement of said portions, said lever system comprising a pair of levers having their fulcrum axes parallel but spaced from one another, means articulating said levers to each other for controlled simultaneous movement about their fulcrum axes, load sensing means responsive to such movement of said levers, and substantially friction free motion guiding means independent of said levers providing a positive mechanical interconnection between said portions during weighing, said motion guiding means controlling the movement of said load supporting portion in a direction substantially parallel to the direction of weight load forces.

40. In a weighing scale, a base portion, a load-supporting portion movable under weighing loads with respect to the base portion, a lever system fulcrumed on one of said portions and operatively interconnecting said portions and actutable by relative movement of said portions, said lever system comprising a pair of levers having their fulcrum axes parallel but spaced from one another, means articulating said levers to each other for controlled simultaneous movement about their fulcrum axes, said articulating means providing a continuous positive mechanical interconnection between said levers for both directions of movement thereof about their respective fulcrum axes, load sensing means responsive to such movement of said levers, and substantially friction free motion guiding means continuously interconnecting said portions independently of said levers for controlling the movement of said load-supporting portion in a direction substantially parallel to the direction of weight load forces.

References Cited by the Examiner

UNITED STATES PATENTS

| | | | |
|---|---|---|---|
| 220,405 | 10/1879 | Meyer | 177—261 |
| 1,022,811 | 4/1912 | Ashley-Reavis | 177—139 |
| 1,526,797 | 2/1925 | Kroeger | 177—143 |
| 1,670,597 | 5/1928 | Stubbs | 177—259 |
| 2,113,337 | 4/1938 | Wehr | 212—2 |
| 2,258,648 | 10/1941 | Hadley | 177—258 |
| 2,643,873 | 6/1953 | Wise | 177—208 |
| 2,793,024 | 5/1957 | Rose et al. | 177—136 |
| 2,822,095 | 2/1958 | Buckingham | 177—139 X |
| 2,850,181 | 9/1958 | Hamblin | 177—139 X |
| 2,877,906 | 3/1959 | Coash et al. | 177—139 X |
| 2,920,654 | 1/1960 | Wise | 92—116 |
| 2,940,746 | 6/1960 | Anderson et al. | 177—136 X |
| 3,026,954 | 3/1962 | Appius | 177—248 |
| 3,062,308 | 11/1962 | Anderson et al. | 177—229 |
| 3,107,743 | 10/1963 | Knobel | 177—116 |

LEYLAND M. MARTIN, *Primary Examiner.*